US009316755B2

(12) United States Patent
Guigné et al.

(10) Patent No.: US 9,316,755 B2
(45) Date of Patent: Apr. 19, 2016

(54) METHOD FOR ACOUSTIC IMAGING OF THE EARTH'S SUBSURFACE USING NON-LINEAR SIGNAL GENERATION AND DETECTION

(71) Applicant: Acoustic Zoom, Inc., Paradise (CA)

(72) Inventors: Jacques Y. Guigné, Paradise (CA); Nicholas G. Pace, Bath (GB)

(73) Assignee: Acoustic Zoom, Inc., Paradise, NL (CA)

( * ) Notice: Subject to any disclaimer, the term of this patent is extended or adjusted under 35 U.S.C. 154(b) by 685 days.

(21) Appl. No.: 13/667,732

(22) Filed: Nov. 2, 2012

(65) Prior Publication Data

US 2014/0129150 A1    May 8, 2014

(51) Int. Cl.
*G01V 1/00* (2006.01)
*G01V 1/28* (2006.01)

(52) U.S. Cl.
CPC .......... *G01V 1/005* (2013.01); *G01V 2210/125* (2013.01); *G01V 2210/127* (2013.01); *G01V 2210/16* (2013.01); *G01V 2210/55* (2013.01); *G01V 2210/588* (2013.01)

(58) Field of Classification Search
CPC ................. G01V 2210/125; G01V 2210/16
See application file for complete search history.

(56) References Cited

U.S. PATENT DOCUMENTS

| 4,924,449 A * | 5/1990 | Guigne ................. 367/104 |
| 2002/0134612 A1 * | 9/2002 | Khan ..................... 181/108 |
| 2009/0122643 A1 * | 5/2009 | Guigne et al. ............ 367/38 |

* cited by examiner

*Primary Examiner* — Phuong Huynh
(74) *Attorney, Agent, or Firm* — Richard A. Fagin

(57) ABSTRACT

A method for seismic surveying includes disposing a plurality of seismic sensors in a selected pattern above an area of the Earth's subsurface. A seismic energy source is repeatedly actuated proximate the seismic sensors. A signal used to actuate the source comprises a linear chirp having a starting frequency and an ending frequency less than twice the starting frequency. Recorded signals are processed to generate an image corresponding to at least one point in the subsurface, the processing includes stacking recordings from each sensor for a plurality of actuations of the source, cross correlating the stacked signals with an expected signal generated by non linearities in the subsurface and beam steering a response of the seismic sensors such that the at least one point is equivalent to a focal point of a response of the plurality of sensors.

20 Claims, 7 Drawing Sheets

METHOD FOR ACOUSTIC IMAGING OF THE EARTH'S SUBSURFACE USING NON-LINEAR SIGNAL GENERATION AND DETECTION

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

This disclosure relates generally to the field of seismic evaluation of formations in the Earth's subsurface. More specifically, the invention relates to methods for determining seismic attributes in specific formations such as non-linearities in formation response to acoustic energy.

U.S. Pat. No. 7,830,478 issued to Guigné et al. describes a method for seismic surveying includes disposing a plurality of seismic sensors in a selected pattern above an area of the Earth's subsurface to be evaluated. A seismic energy source is repeatedly actuated proximate the seismic sensors. Signals generated by the seismic sensors, indexed in time with respect to each actuation of the seismic energy source are recorded. The recorded signals are processed to generate an image corresponding to at least one point in the subsurface. The processing includes stacking recordings from each sensor for a plurality of actuations of the source and beam steering a response of the seismic sensors such that the at least one point is equivalent to a focal point of a response of the plurality of sensors.

It is known in the art that micro-inhomogeneous regions of rock can have very large non linear effect on seismic signals, described by a large value of the nonlinearity parameter $\beta$. The term nonlinear in the context of vibroseis often refers to the nature of the amplitude and frequency of the drive to the plate being a nonlinear function of time. In this disclosure the term "ramped chirps" is used to indicated the chirp amplitude is not constant with time. The value of $\beta$ for water is about 3 and it is claimed that micro-inhomogeneous regions of rock yield effective values of $\beta$ that may be larger than those of isotropic solids by several orders of magnitude. Values of $\beta$ between 80 and 1000 have been observed for rocks.

There exists a need for acoustic evaluation of the subsurface that enables identification of regions of non-linearities.

SUMMARY

One aspect a method for seismic surveying including disposing a plurality of seismic sensors in a selected pattern above an area of the Earth's subsurface. A seismic energy source is repeatedly actuated proximate the seismic sensors. A signal used to actuate the source comprises a linear chirp having a starting frequency and an ending frequency less than twice the starting frequency. Recorded signals are processed to generate an image corresponding to at least one point in the subsurface, the processing includes stacking recordings from each sensor for a plurality of actuations of the source, cross correlating the stacked signals with an expected signal generated by non linearities in the subsurface and beam steering a response of the seismic sensors such that the at least one point is equivalent to a focal point of a response of the plurality of sensors.

Other aspects and advantages of the invention will be apparent from the description and claims which follow.

DETAILED DESCRIPTION

Figure 1:
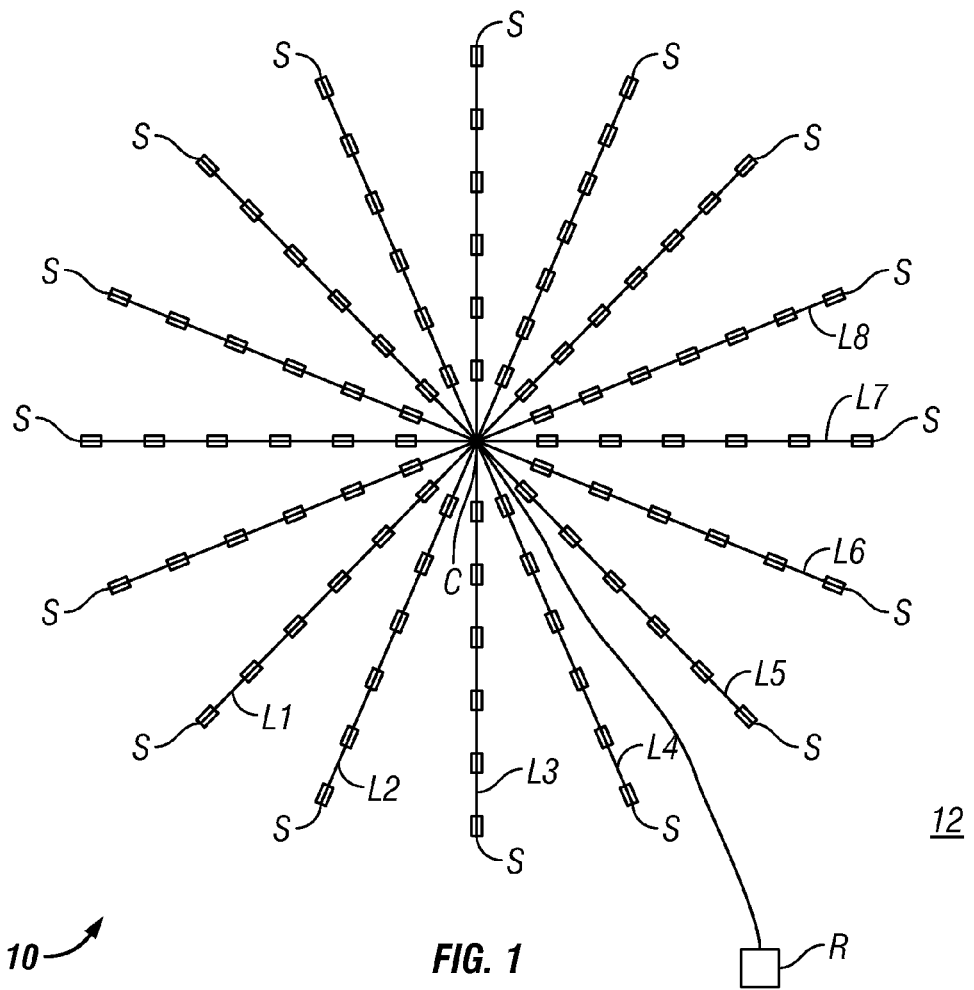
FIG. 1 shows an example of a sensor array used for subsurface imaging according to the invention.

An objective of methods according to the present disclosure is to provide a localized examination of subsurface Earth structures with higher resolution (both laterally and vertically) than is typically possible using conventional sub-bottom acoustic surveying and to identify non-linearities therein using a specific type of source signal. In some examples, the localized examination may be repeated at selected times to determine changes in spatial distribution of fluids in subsurface rock formations. Various examples of methods according to the invention may provide such enhanced resolution examinations at depths of 1.0 km below the Earth's surface, or in examples in marine environments within a similar range of distances below the water bottom. In methods according to the present example relatively high frequency (as contrasted with conventional seismic) non-linearly generated seismic energy is used, and coherent stacking from multiple actuations of a seismic energy source may be used to mitigate the attenuation of such higher frequency energy which occurs as a result of the acoustic properties of the subsurface rock formations. The overall resolution of a seismic survey made according to various examples of the invention can thus be better than that obtainable from conventional sub-bottom surveys.

The lateral resolution of surveys made according to the disclosed examples depends, as is the case for conventional seismic surveys, on the aperture size of an array of seismic sensors used. Data processing according to the invention, however, is relatively fast because it is based on the steering of focused beams, rather than on depth or time migration analysis. Methods according to the present disclosure thus can provide the ability to monitor subsurface reservoirs allowing a better understanding of the existence of non-linear responsive regions in the subsurface An example seismic sensor array that may be used with the invention is shown schematically at 10 in FIG. 1. Such as system is more fully described in U.S. Patent Application Publication No. 2009/0122645 filed by Guigné et al. and incorporated herein by reference for all purposes. In the example shown in FIG. 1, the seismic sensor array 10 may be disposed on the bottom of a body of water 12 such as a lake or the ocean. The system as shown may also be deployed on the land surface as will be further explained. The seismic sensor array 10 may include individual seismic sensor cables L1 through L8. The cables L1 through L8 may include a plurality of spaced apart seismic sensor modules S disposed along the length of each seismic sensor cable L1-L8. Each of the seismic sensor modules S may include a so-called "four-component" seismic sensor (not shown separately). "Four-component" seismic sensors typically include three, orthogonally oriented particle motion responsive sensors such as geophones or accelerometers, and a substantially collocated pressure or pressure time gradient responsive sensor such as a hydrophone. See, for example, U.S. Pat. No. 5,774,417 issued to Corrigan et al. for an example of such four component seismic sensors used in a sensor cable for deployment on the bottom of a body of water. Examples of the longitudinal spacing between sensor modules and the number of the sensor modules S on each seismic sensor cable L1-L8 will be further explained below with reference to FIG. 2. Each seismic sensor (not shown separately) in each sensor module S may generate electrical and/or optical signals related to the parameter being measured (e.g., velocity, acceleration, pressure or pressure time gradient). The sensor signals may be communicated according to the type of sensor output signal to a recording unit R. The recording unit R may be disposed on the water bottom, or in a buoy near the water surface for signal record storage and later retrieval.

A seismic energy source W, which may be vibrators, magneto strictive or piezoelectric transducers may be disposed proximate the center C of the sensor array 10. The source W is actuated at selected times, and a time indexed record of the signals produced by each sensor in each module S can be recorded in the recording unit R for later analysis. Particular characteristics of the seismic energy source W and the signal generated thereby will be further explained below.

The seismic sensor cables L1-L8 may be arranged in a radial pattern as shown in FIG. 1. The seismic sensor cables L1-L8 in the present example may be symmetrically arranged about the center point C of the array 10 and angularly displaced from each other by an angle of about 22½ degrees. In other examples, fewer or more cables may be used than is shown in FIG. 1. It is contemplated that in such other examples the angular displacement between each of the cables will be approximately equal, however equal angular displacement between sensor cables is not a limit on the scope of the present invention. The radial sensor cable arrangement shown in FIG. 1 may be advantageous in calculated beam steering of the sensor response. However, other geometric arrangements may be used that can be beam steered.

Figure 1A:
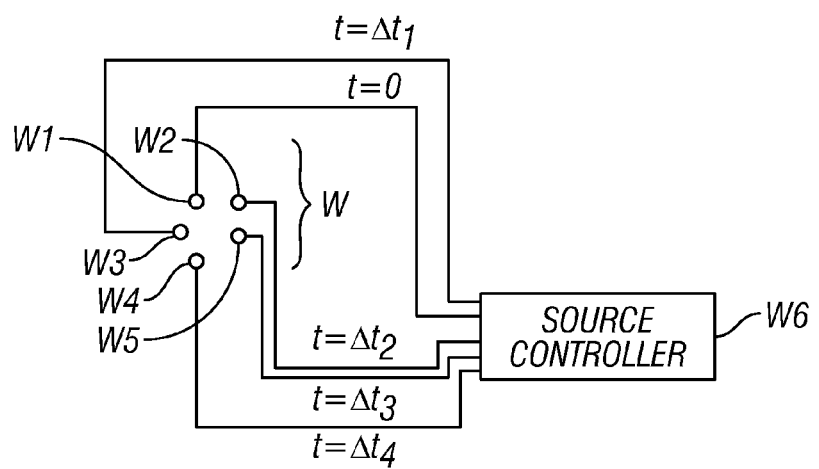
FIG. 1A shows a seismic energy source array that may be used with the array shown in FIG. 1.

FIG. 1A shows an example of the seismic energy source W in more detail. The source W may consist of a plurality of individual air guns or water guns or other suitable seismic energy sources such as explained above, shown at W1 through W5 arranged in a small-diameter, generally circular pattern. The individual sources W1-W5 may be actuated by a source controller W6, which may be in operative communication with the recording unit (R in FIG. 1) so that the signal recordings may be time indexed to the actuation time of the source W. In the present example, the source controller W6 may be configured to successively, individually (or in subsets or subcombinations) actuate each source W1-W5 at a selected time delay (which may be zero or any other selected time delay) after the actuation of the first one of the sources W1-W5. The time delay may be selected such that the energy output of the array of sources W1-W5 is oriented substantially along a selected direction. In such examples, the directivity of the source W may be used to further illuminate subsurface features identified during signal processing or otherwise. Such specific illumination will be further explained below with reference to FIG. 3.

Figure 1B:
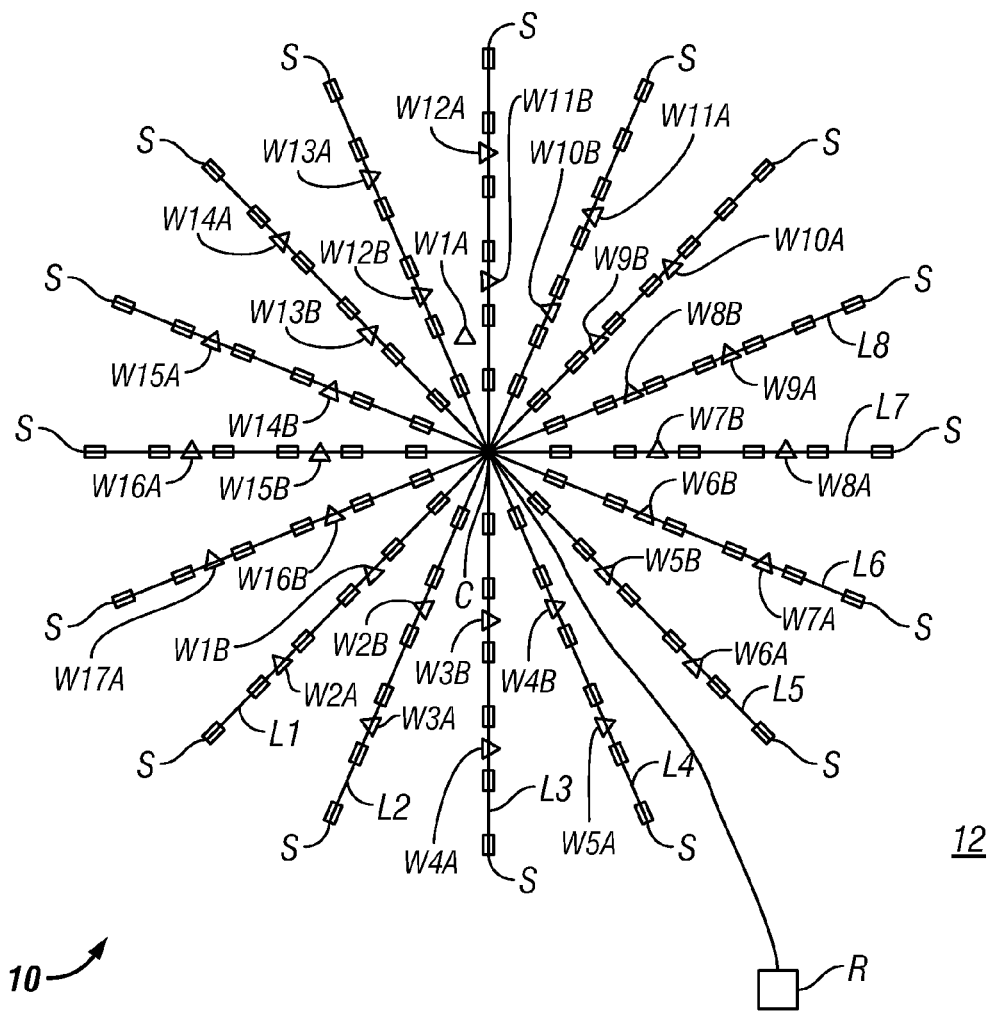
FIG. 1B shows another possible implementation having even greater source focusing capability than the example shown in FIG. 1A.

Another possible implementation having even greater source focusing capability than the example shown in FIG. 1A is shown in FIG. 1B. The example shown in FIG. 1B includes a first seismic energy source disposed at a first selected position being a selected radial distance from the center of the array 10. The example shown in FIG. 1B has such first positions being along each of the seismic sensor cables L1-L8. Such seismic energy sources are shown at W2B through W17B, inclusive. A second seismic energy source may be placed at a second selected position being a second radial distance from the center of the array 10. The example of FIG. 1B has these positions being along each of the sensor cables L1-L8. Such second sources are shown correspondingly at W2A through W17A inclusive. A seismic energy source W1A may also be disposed proximate the center of the array 10. The seismic energy sources W1A through W17A and W2B through W17B may be controlled by a seismic source controller similar in function to the device described above with reference to FIG. 1A at W6. In the In the example shown in FIG. 1B, the seismic sources may in combination form a steerable beam array having an aperture of about two wavelengths of the seismic energy emitted by the sources. The actuation time of the individual sources W1A through W17B may be selected to result in a seismic energy beam directed toward a selected subsurface location. Actuation of the sources with selected delay timing as above may be repeated with different time delays for each individual source to selectively illuminate different positions in the subsurface.

It has been determined through response simulation that using the additional seismic sources W2A through W17B as explained above provides good beam steering response when each first source position is about one wavelength of the seismic energy from the center of the array 10, and each second source position is about two wavelengths from the center of the array 10. The arrangement shown in FIG. 1B includes having the first and second source positions along each sensor cable L1-L8, however, the sources do not need to be so located. The seismic energy sources can be located at any circumferential position with respect to the sensor cables.

Figure 1C:
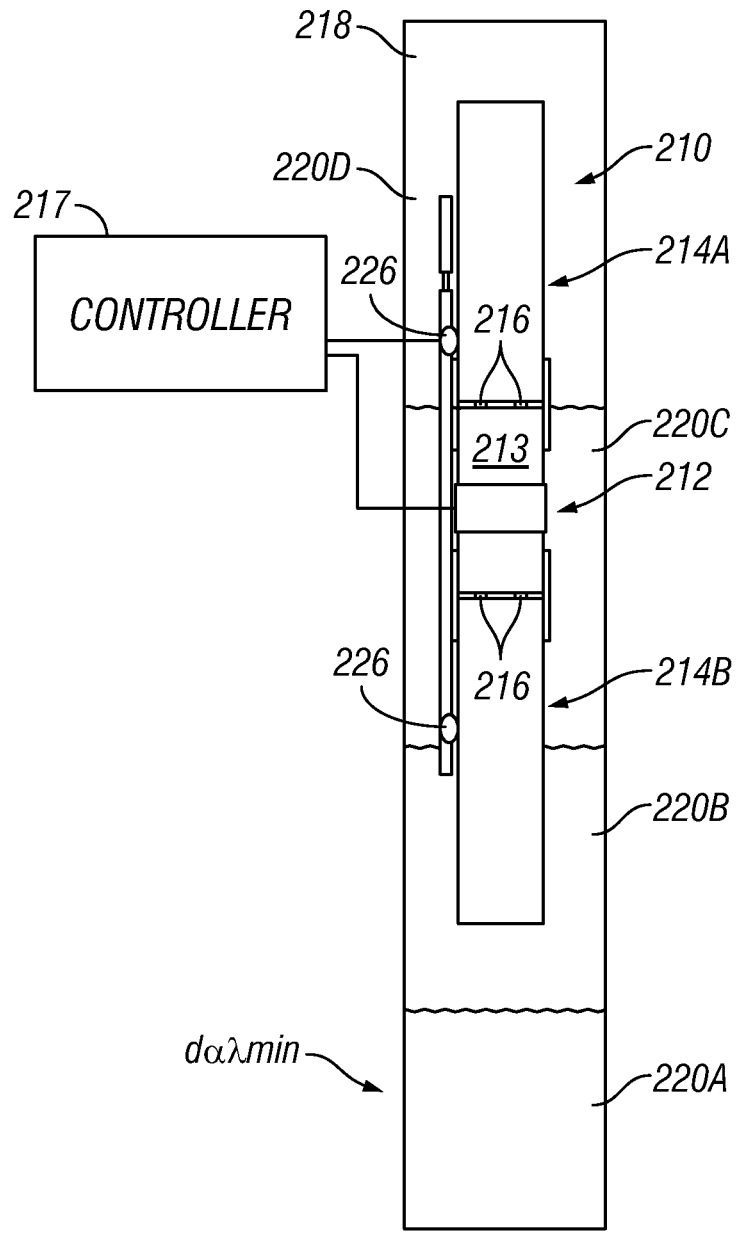
FIG. 1C shows an example resonant acoustic energy source.

Another example seismic energy source that may be used individually or in arrays as shown in FIG. 1A is shown in FIG. 1C. Such source may be used on the bottom of a body of water or in shallow wellbores proximate the land surface. The source 210 is shown disposed in a wellbore 218 drilled proximate the Earth's surface or the bottom of a body of water. The source 210 may be so disposed by wireline, slickline, pipe, coiled tubing or any other known manner of conveyance for wellbore devices. A total depth of the wellbore 218 may be selected based on the lowest frequency intended to be radiated into the subsurface formations below the wellbore 218. The wellbore 218 may be filled with stratified layers 220A, 220B, 220C, 220D of fluid, each having a unique density and/or viscosity so that acoustic energy at a plurality may be efficiently coupled into the formations below the wellbore 218. The thicknesses and numbers of fluid layers may be optimized for the particular frequency sweep range intended to be radiated from any example of the source 210.

The source 210 may include a piezoelectric or similar electric to acoustic transduction element (transducer) 212

The transducer 212 is coupled generally in the center of a Helmholtz resonator 213. The resonator 213 may include a generally tubular interior open to the wellbore fluids 220A-220D at both longitudinal ends, and include frequency tuning slots 216 about the central exterior. As explained above, the resonant frequency of the resonator 213 may be selected by exposing selected lengths of the slots 216. In the present example, such selective exposure may be performed by covering the exterior of the resonator 213 with impermeable tubes 214A, 214B at opposed longitudinal ends. The tubes 214A, 214B may be moved in longitudinally opposed directions by a linear actuator 26. The linear actuator 26 may be powered and controlled by a controller 217 such as a microprocessor based controller/driver combination. The controller 217 may also operate the transducer 212.

As explained above, the movement of the tubes 214A, 214B may be controlled by the controller 217 so that the resonant frequency of the resonator 213 can substantially match the instantaneous frequency of current applied by the controller 217 to the transducer 212. Typically, such frequency will be within a selected sweep range having a selected sweep cycle duration as will be further explained below.

Also as previously explained above, and with reference to FIG. 1A, a plurality or array of sources which may be configured substantially as explained with reference to FIG. 1A may be arranged in a selected pattern near the Earth's surface or water bottom. It is expected that each of the plurality of sources will be disposed in a corresponding wellbore, each of which may be filled with stratified fluids. A master controller 217A may either control operation of the individual controllers of each source 210 or may operate all of the sources. The configuration shown in FIG. 1A may be operated by the master controller such that each of the sources 210 may be energized through its respective frequency sweep with a time delay respective to the other sources s10 to beam steer the output of the sources.

In other examples of a system to be used on the land surface, one or more conventional or other type of seismic vibrator may be used as the seismic energy source. One example seismic vibrator is described in U.S. Pat. No. 5,252,785 issued to Christensen and incorporated herein by reference.

A longitudinal spacing between seismic sensor modules on each sensor cable, and a number of such seismic sensor modules on each cable may be determined by the frequency range over which a seismic analysis of the subsurface rock formations is to be performed Resulting from the transmission of a signal containing a given range of frequencies there is another range of frequencies that correspond the those that are generated by the interaction of the transmitted signal with regions of non linearity. Selection of suitable frequency for the seismic energy source will be explained in more detail below. The longitudinal spacing between seismic sensor modules forming the receiver array is preferably selected such that for a particular seismic frequency the spacing should not be greater than about one-half the seismic energy wavelength. At each frequency an example cable length may be about 80 to 120 wavelengths of the longest wavelength seismic energy frequency. Thus, it is possible to use an array having sensor cables of overall length 120 wavelengths at the lowest frequency, but variable longitudinal spacing along each cable between the seismic sensor modules, so that the overall array will include 120 wavelength-long sensor arrays at higher frequencies with a half-wavelength spacing at such higher frequencies. The sound speed (seismic velocity) used to determine the wavelength is that within the rock formations near the water bottom (or the Earth's surface in land based surveys).

Figure 2:
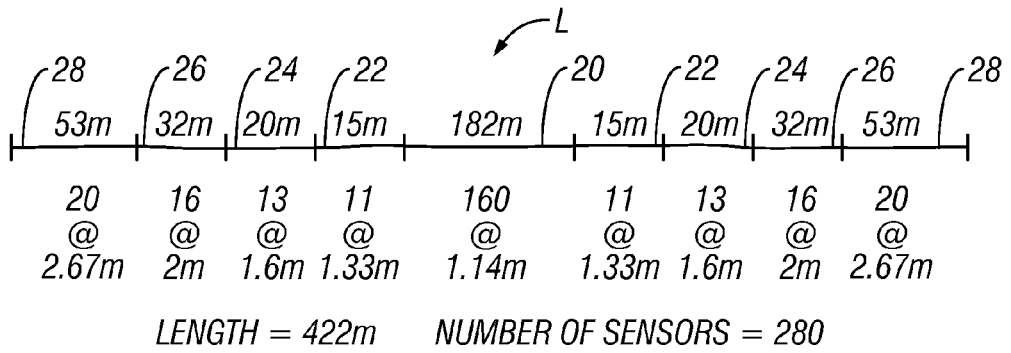
FIG. 2 shows an example of seismic sensor distribution along one line of an array such as shown in FIG. 1.

An example of possible longitudinal spacing between seismic sensor modules (S in FIG. 1) and numbers of such seismic sensor modules is shown schematically in FIG. 2. The seismic sensor modules (S in FIG. 1) may be more closely spaced along each cable L nearest the center point (C in FIG. 1) of the array (10 in FIG. 1), becoming more sparsely spaced toward the longitudinal end of each cable L. In the example shown in FIG. 2, a centermost portion 10 of the cable L can be about 182 meters long and have 160 sensor modules spaced apart from each other by about 1.14 meters. Laterally adjacent on either end of the centermost portion 20, a first lateral portion 22 may include 11 sensor modules spaced apart from each other by about 1.33 meters and have an overall length of about 15 meters. A second lateral portion 24 may be disposed laterally adjacent each first portion 22 and have 13 sensor modules spaced about 1.6 meters from each other and have overall length of about 20 meters. Respective third 26 and fourth 28 lateral portions may be adjacent as shown in FIG. 2 and include, respectively, 16 and 20 sensor modules spaced apart by 2 and 2.67 meters, and have overall length of 32 and 53 meters. Overall, each cable L in the array (10 in FIG. 1) may include 280 sensor modules and have length of about 422 meters. Other lengths and sensor module spacings may be used. The lateral resolution of the measurements made by the array will increase as the length and the number of sensor modules on each cable L is increased. Vertical resolution of the measurements made by the array is related to the frequency content of the seismic energy.

Figure 3:
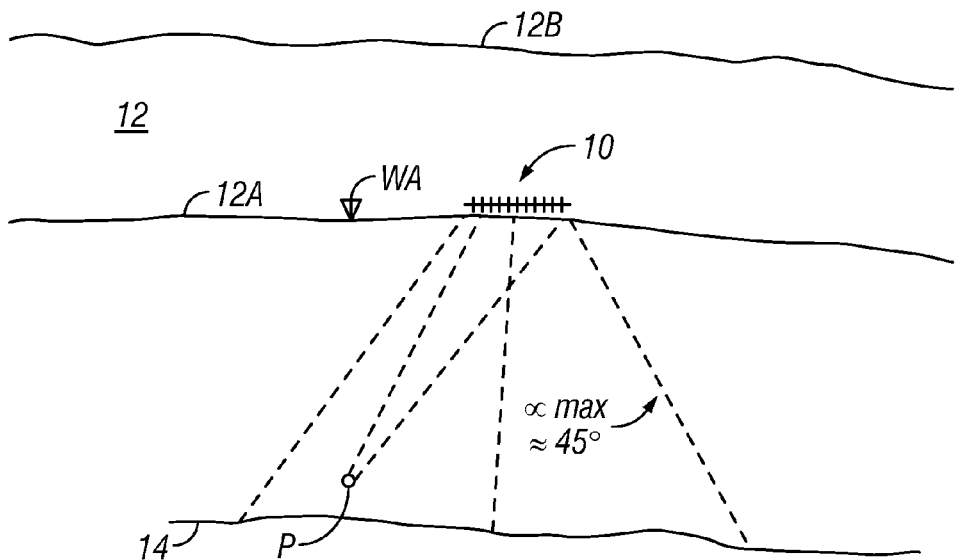
FIG. 3 shows a cross section of the subsurface to illustrate lateral evaluation capability of an array such as shown in FIG. 1.

Referring to FIG. 3, the sensor array 10 is shown disposed on the bottom 12A of the body of water 12. The water top is shown at 12B. Methods according to the present disclosure may provide increased resolution images of subsurface formations, such as shown at 14, and may provide the capability to image within an aperture defined by an angle shown at a in FIG. 3. It is believed high resolution images may be obtained at angles of 45 degrees or more using methods disclosed herein.

It should be clear from the above description that a system and method as described herein is equally applicable to marine and land use. Accordingly, the methods and systems disclosed herein are not limited to either environment.

Figure 4:
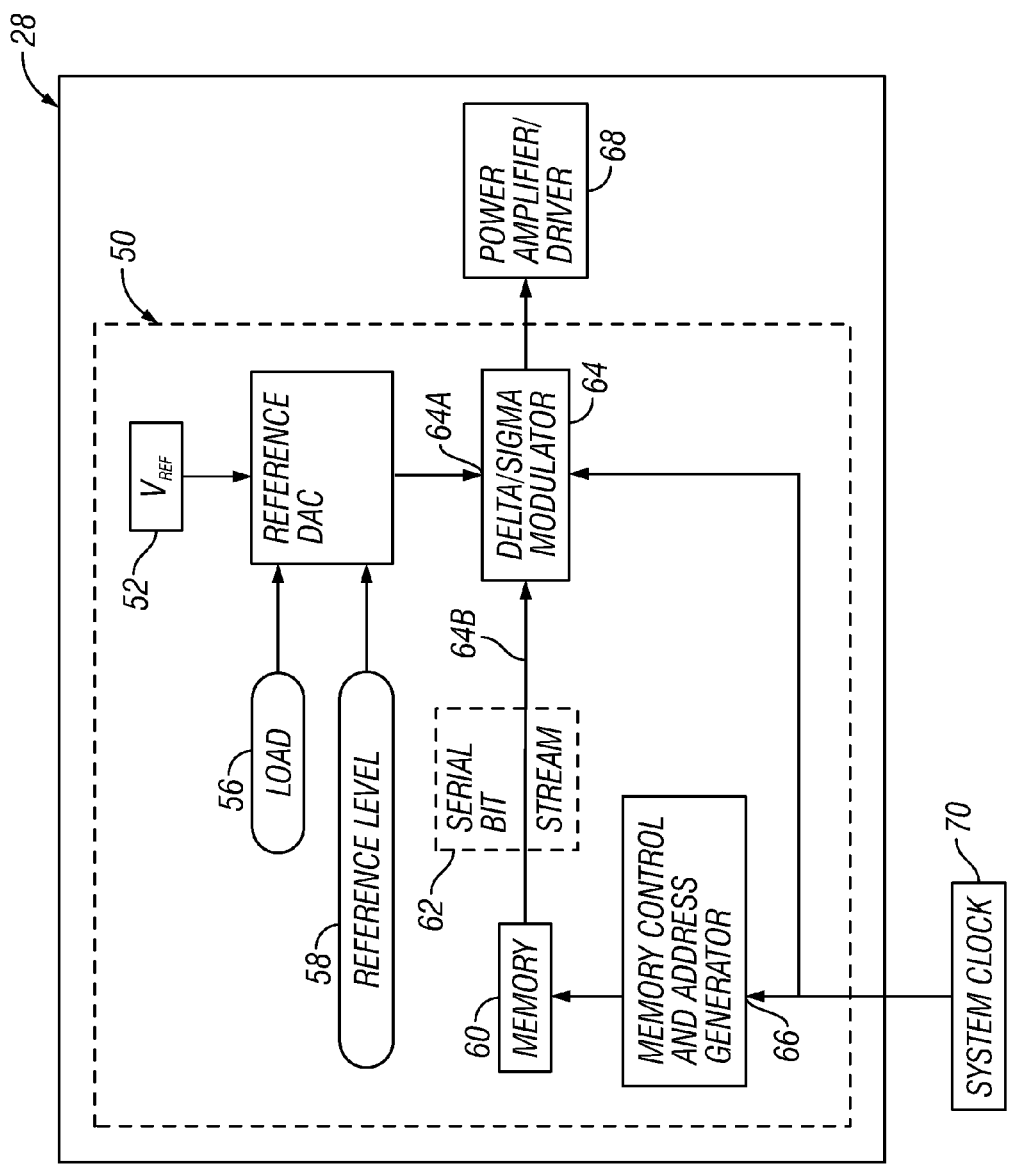
FIG. 4 shows an example signal generator that may be used to generate an acoustic signal for examination of the subsurface.

Referring to FIG. 4, the source 28 (corresponding to any and all sources shown in FIGS. 1, 1A and 1B can be connected to a signal generator that will produce signals to actuate the source(s) with acoustic energy as may be useful to perform the disclosed methods herein. Such a signal generator is more fully described in U.S. Pat. No. 5,587,727 issued to Fabris et al. an incorporated herein by reference. The output amplitude of the source 28 may be controlled by a reference level digital word conducted to an input terminal 58 of a reference digital to analog converter (DAC) 54 forming part of the source 28. The input terminal 58 of the reference DAC 54 shown in FIG. 4 corresponds to any digital word input terminals of the source 28. The input terminal 58 is connected to the corresponding terminal on the processor 51. The digital word present at the input terminal 58 is loaded into the reference DAC 54 when a load command is applied to a command terminal 56 on the reference DAC 54 by a processor 51. A load command may be generated by the processor 51 when the processor 51 calculates that the value of the digital word is to be changed. The reference DAC 54 is connected to a precision voltage reference source 52. The precision voltage reference source 52 generates a substantially constant voltage direct current (DC). The substantially constant voltage DC from the reference source 52 maintains accuracy and repeatability of conversion of the digital word present at the input terminal into an output level control signal by the reference DAC 54.

The output of the reference DAC 54 typically is a substantially constant voltage DC which is conducted to a delta-sigma modulation 64 at a reference input terminal 64A. As previously explained, the magnitude of the DC voltage output from the reference DAC 54 is determined by the reference digital word conducted to the input terminal 58.

A serial bit stream 62 is generated by a memory control and address generator 66 sequentially activating a digital memory 60. The serial bit stream 62 is connected to a digital input terminal 64B on the modulator 64. The serial bit stream 62 contains a series of numbers corresponding in magnitude to the instantaneous output magnitude of the source 28 at spaced apart time intervals. In the present example the waveform is typically sinusoidal with a swept frequency and may include a single frequency sinusoid. The serial bit stream 62 therefore determines the waveform shape and frequency about the frequency of the current output from the source 28. The output from the modulator 64 is conducted to a circuit which can be a power amplifier or a source electrode driver as shown at 68, and thence to electrodes such as the focusing electrodes shown as 22 and 22A in FIG. 2.

The output of the modulator 64 comprises analog signals proportional in magnitude to the magnitude of the reference voltage conducted from the reference DAC 54. The modulator 64 generates output samples at a rate which is determined by the frequency of a system clock 70 connected to the modulator 64. The clock 70 frequency is much higher than the output frequency of the source 28. In the present embodiment the system clock 70 frequency typically is 1.024 MHz. The high frequency samples from the modulator 64 are filtered into the correct output waveform in a low-pass filter forming part of the amplifier 68. Because the output frequency of the samples generated by the modulator 64 is much higher than the operating frequency of the current source 28, the filter components which form part of the amplifier 68 can have cut-off frequencies well above the operating frequency of the source 28. In the present embodiment, the filter forming part of the amplifier 68, can have a cut-off frequency of 256 KHz, which is one-fourth the frequency of the system clock 70, but is many times the highest operating frequency of the source 28 (which may be on the order of 500 Hz). The filter components forming part of the amplifier 68 can therefore be designed to have gradual "roll-off" characteristics, which greatly simplifies the design of the filter components.

In the present example, the source 28 can comprise an integrated module, shown as 50 in FIG. 4, including the voltage reference 52, the reference DAC 54, the modulator 64, the memory 60, and the memory controller 66. The module 50 can be programmed, by insertion of appropriate bit stream data into the memory 60 during construction or servicing of the module 50, to generate a predetermined signal to be explained further below.

The frequency spectrum of the signal that results from non linear properties of the medium is governed by the second time derivative of the square of the transmitted signal from the source or sources as shown in FIGS. 1, 1A and 1B. This fact allows the transmitted signal to be designed such that the signal that results from non linear properties of the subbottom or subsurface formations has a frequency spectrum that does not overlap with that of the transmitted signal.

One type of such a transmitted signal is a chirp signal with options for its amplitude as well as frequency to vary with time, one example is a ramped amplitude linear-sweep chirp. If the transmitted chirp has a frequency in a range from frequency $f_0$ to $f_1$ (its so called primary spectrum) then the frequency spectrum of the signal that results from non linear properties of the subsurface formations will have a spectrum that extends from $2f_0$ to $2f_1$ (its so called secondary spectrum). To avoid overlap of the primary and secondary frequency spectra then $f_1$ should be less than double $f_0$.

In the present example, a linear chirp has instantaneous frequency that varies linearly with time as represented by the expression:

$$f(t) = f_0 + kt \tag{1}$$

Where $f_0$ is the starting frequency and k is the rate of frequency increase. The corresponding time domain function for such a sinusoidal linear chirp is:

$$x(t) = \sin\left[2\pi \int_0^t f(t') dt'\right] = \sin\left[2\pi (f_0 + kt/2)t\right] \tag{2}$$

The non linear signal resulting from a linear chirp with ramped amplitude may be calculated from the following expression which is the transmitted signal from which a simulation of the non linear signal is generated as will be further explained:

$$a(t) = E\left[\sin\left(2\pi\left(f_0 + \frac{kt}{2}\right)t\right)\right] \tag{3}$$

Where $E = Mt + C = \dfrac{t}{\tau} + 0.5$

The non linear signal resulting from a constant amplitude linear chirp with a single frequency may be calculated from the following expression which is the transmitted signal from which a simulation of the non linear signal is generated, as will be further explained:

$$a(t) = \sin\left(2\pi\left(f_0 + \frac{kt}{2}\right)t\right) + A\sin(2\pi f_2 t) \tag{4}$$

As may be performed using the receiver arrangements shown in and explained with reference to FIGS. 1, 1A and 1B, the detected signals from a plurality of actuations of the source(s) may be stacked. Such stacking is facilitated due to the lack of movement of the source(s) and receivers during signal acquisition. If there are secondary signals present in the received signals then these also will stack. Secondary signals will only be present if there is a region within the earth's subsurface or sub bottom that exhibits non linear behavior, If a medium is non linear then the speed of a sound wave depends on its amplitude. Thus the peaks of the sound wave travel faster than the troughs leading to a departure from a sinusoidal form to an asymmetrical form. This indicates that additional frequencies have been generated as a result of the non-linearity present in the formations.

Upon detection by the receivers (FIGS. 1, 1A, 1B) the signals may be stacked and then may be compressed using cross correlation with an approximation of the signal used to excite the source(s). Such cross correlation may be direct for purposes of identifying the primary spectrum signals, i.e., the stacked received signals may be cross-correlated with the source signal generated by the signal generator FIG. 4). The result of this cross correlation will represent the primary signal due to linear response of the subsurface formations.

If non-linearity exists in the subsurface, one may expect presence of the secondary signal. To detect the secondary signal, the stacked received signal may be cross-correlated with the theoretical expected secondary signal. Such theoretical expected secondary signal may be generated using the second time derivative of the square of the source signal (generated as described above). The result of such cross correlation will represent the non-linear response portion of the subsurface to acoustic energy.

The primary signal data and non-linear response data may be processed differently. The primary spectrum data may be used as previously documented in the Guigné et al publication referenced above, and may, as explained above, be used to filter the stacked signals to remove the primary spectrum components of the received signals. The earth has a general level of non linearity just as all materials do which is characterized by a beta value which would provide secondary signals about 40 dB or more below the secondary signals expected from regions in which micro inhomogeneities may give rise to large non linear behavior.

Figure 5:
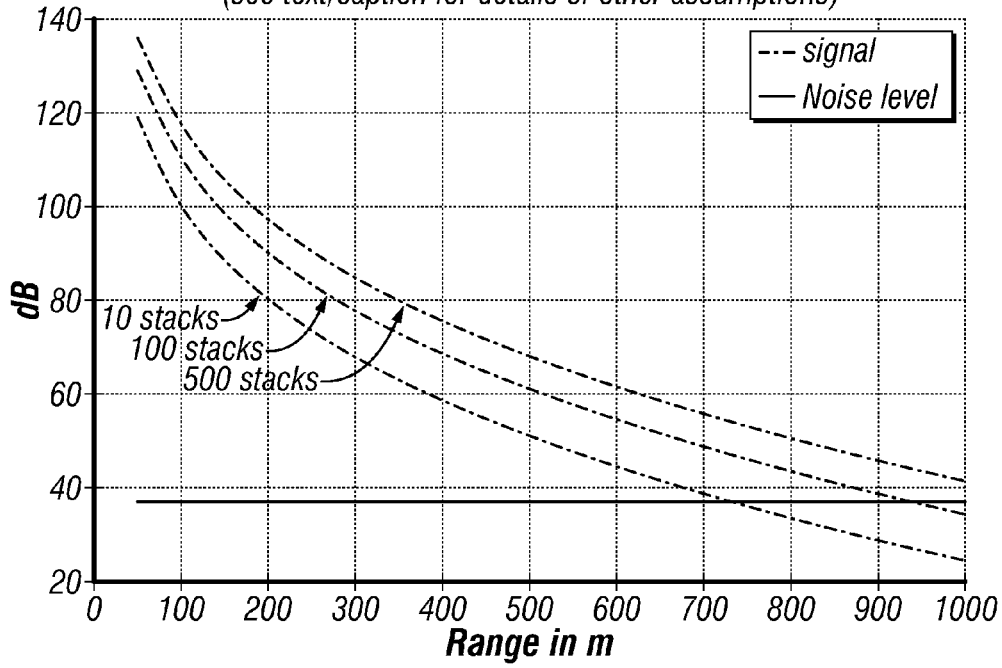
FIG. 5 shows a graph of expected secondary signal level in the presence or absence of non-linearities in the subsurface.

As can be observed in FIG. 5, if the secondary signal is due only to background non linearity of the formations, the signal level in the expected frequency band of the secondary signal would be below the noise floor. If a region of significant non linearity, such as a pocket of micro inhomogeneity is encountered, the signal level in the secondary band would rise significantly above the noise floor, e.g., down to depths of about 1000 m below the surface or water bottom, depending on the number of stacks. However, this may still be many dB below the primary signal return. Unless the primary and secondary frequency bands had, by design, been separated, the detection of the significant secondary signal would not have been possible.

Figure 6:
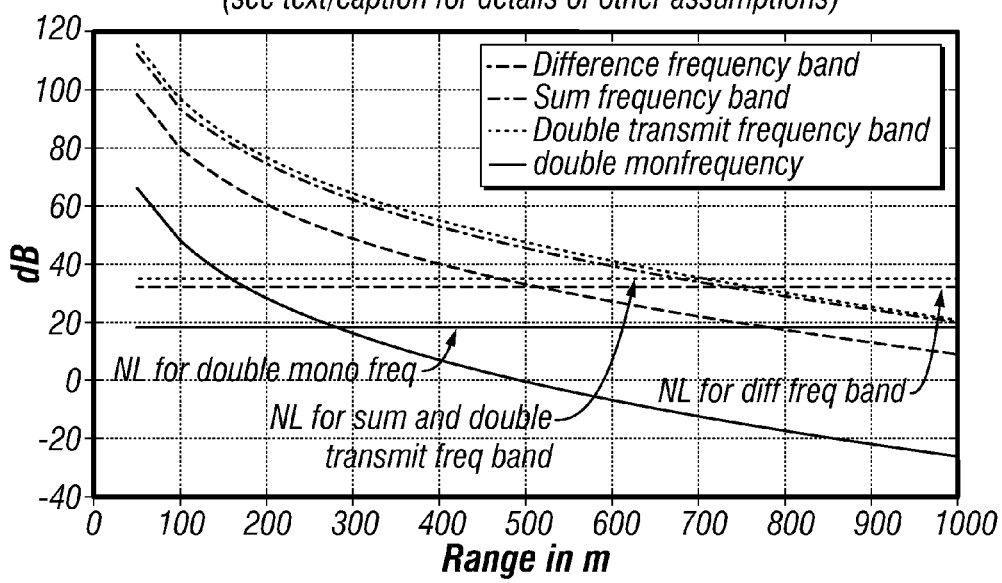
FIG. 6 shows a graph of secondary signal response wherein a primary transmitted signal includes a chirp plus a single frequency.

If the design of the transmitted signal is a chirp containing a single frequency, the choice of secondary frequency bands to avoid overlap is slightly more complicated but it appears, as shown in FIG. 6, that only the higher frequency bands will be useful in the present context.

Figure 7:
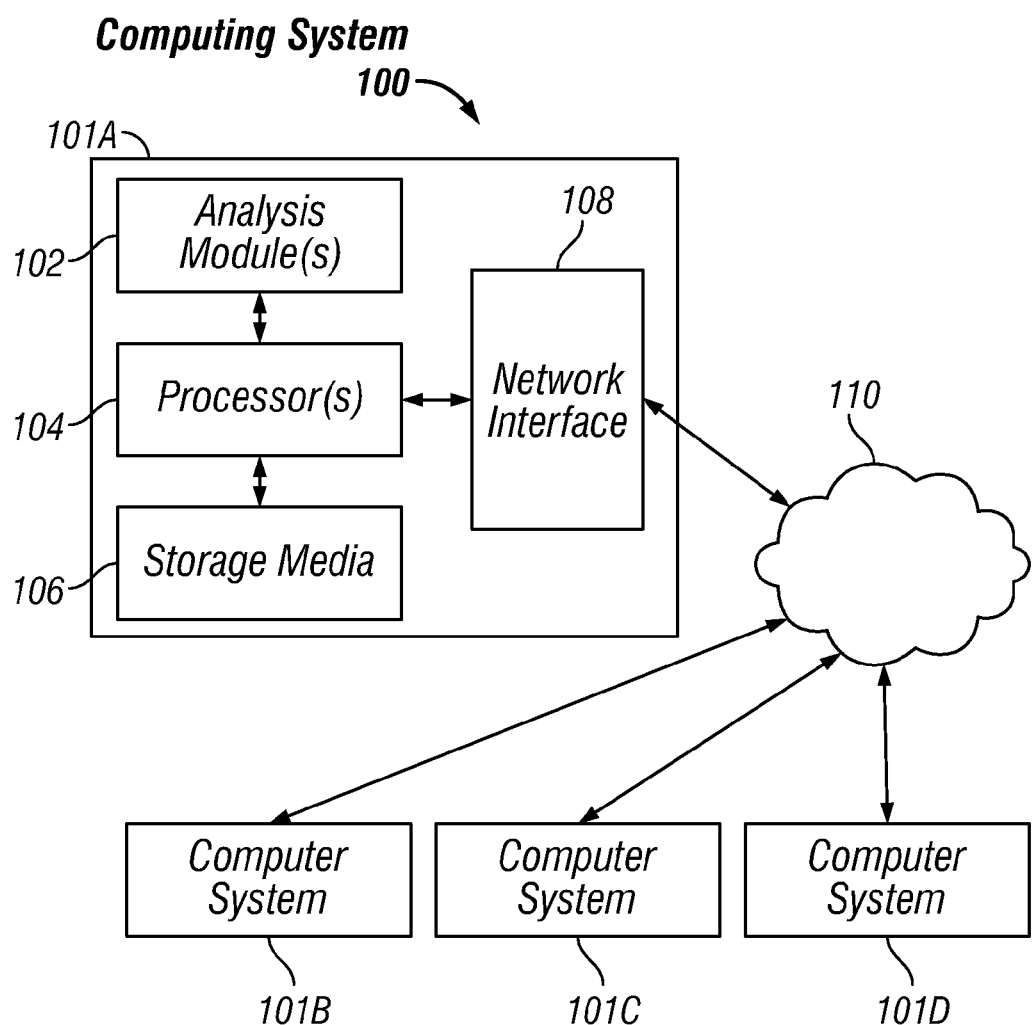
FIG. 7 shows an example computer system for performing data processing explained herein.

FIG. 7 shows an example computing system 100 in accordance with some embodiments that may be used to perform signal processing as explained above with reference to FIGS. 5 and 6. The computing system 100 may be an individual computer system 101A or an arrangement of distributed computer systems. The computer system 101A may include one or more analysis modules 102 that may be configured to perform various processing acts such as those explained above To perform these various acts, the analysis module 102 may execute independently, or in coordination with, one or more processors 104, which is (or are) connected to one or more storage media 106. The processor(s) 104 is (or are) also connected to a network interface 108 to allow the computer system 101A to communicate over a data network 110 with one or more additional computer systems and/or computing systems, such as 101B, 101C, and/or 101D (note that computer systems 101B, 101C and/or 101D may or may not share the same architecture as computer system 101A, and may be located in different physical locations, e.g. computer systems 101A and 101B may be on a ship underway on the ocean, while in communication with one or more computer systems such as 101C and/or 101D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 106 can be implemented as one or more computer-readable or machine-readable storage media. Note that while in the example system shown in FIG. 7, storage media 106 is depicted as within computer system 101A, in some embodiments, storage media 106 may be distributed within and/or across multiple internal and/or external enclosures of computing system 101A and/or additional computing systems. Storage media 106 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 100 is only one example of a computing system, and that computing system 100 may have more or fewer components than shown, may combine additional components not depicted in the embodiment of FIG. 7, and/or computing system 100 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for seismic surveying, comprising:
disposing a plurality of seismic sensors in a selected pattern above an area of the Earth's subsurface to be evaluated;
repeatedly actuating a seismic energy source proximate the seismic sensors, wherein a signal used to actuate the source comprises a linear chirp having a starting frequency and an ending frequency selected such that a signal resulting from non linear properties of subsurface formations has a frequency spectrum that does not overlap a frequency range of the linear chirp;
recording signals generated by the seismic sensors indexed in time with respect to each actuation of the seismic energy source; and in a computer processing the recorded signals to generate an image corresponding to at least one point in the subsurface, the processing including stacking recordings from each sensor for a plurality of actuations of the source, cross correlating the stacked signals with an expected signal generated by non linearities in the subsurface and beam steering a response of the seismic sensors such that the at least one point is equivalent to a focal point of a response of the plurality of sensors.

2. The method of claim 1 wherein the selected pattern comprises lines of sensors radially extending from a center point of an array.

3. The method of claim 1 wherein a number of seismic sensors in the selected pattern and a longitudinal spacing between seismic sensors are related to a maximum seismic energy frequency to be detected from the subsurface.

4. The method of claim 1 further comprising directing energy from the seismic energy source toward a selected point in the subsurface.

5. The method of claim 1 wherein the directing comprises actuating each of a plurality of individual seismic energy sources at a time causing an output thereof to be directed substantially toward the selected point.

6. The method of claim 1 wherein the beam steering comprises adding a selected time delay to the recording from each seismic sensor.

7. The method of claim 1 wherein the selected time delay is calculated from seismic velocity distribution determined by a previously performed seismic survey velocity analysis.

8. The method of claim 1 wherein each seismic sensor comprises three mutually orthogonal particle motion sensing elements and a substantially collocated pressure responsive sensing element.

9. The method of claim 1 wherein the seismic energy source is substantially collocated with a center of the selected pattern.

10. The method of claim 1 further comprising positioning an auxiliary seismic energy source substantially directly above a selected point in the subsurface, actuating the auxiliary seismic energy source and recording signals generated by the seismic sensors in response thereto.

11. The method of claim 1 further comprising determining a spatial distribution of at least one constituent of a subsurface reservoir from the processed recorded signals, repeating the repeated actuation, recording and processing after a selected time period, and determining a change in the spatial distribution of at least one constituent from the repeated processing.

12. The method of claim 1 wherein the seismic energy source and the plurality of sensors are substantially stationary during performance of the method.

13. The method of claim 1 wherein the source actuation signal comprises ramped amplitude chirp.

14. The method of claim 1 wherein the actuation signal further comprises a single frequency combined with a chirp.

15. The method of claim 1 wherein a portion of the expected signal comprises a second time derivative of the square of the source actuation signal.

16. The method of claim 1 further comprising cross correlating the stacked signals with the source actuation signal, and using the result thereof to filter out a primary spectrum response from the stacked signals.

17. The method of claim 1 further comprising cross correlating the stacked signals with the expected form of the non linearly generated signal, and using the result thereof to filter out a secondary spectrum response from the stacked signals.

18. The method of claim 1 wherein the source and seismic sensors are deployed proximate a land surface.

19. The method of claim 1 wherein the source and seismic sensors are deployed proximate a bottom of a body of water.

20. The method of claim 1 wherein the linear chirp has a starting frequency and an ending frequency less than twice the starting frequency.

* * * * *